United States Patent [19]
Vail

[11] 3,714,528
[45] Jan. 30, 1973

[54] ELECTRICAL CAPACITOR WITH FILM-PAPER DIELECTRIC

[75] Inventor: Atlee G. Vail, Stamford, Vt.

[73] Assignee: Sprague Electric Company, North Adams, Mass.

[22] Filed: Jan. 13, 1972

[21] Appl. No.: 217,571

[52] U.S. Cl..................................317/258, 317/260
[51] Int. Cl. ...............................................H01g 1/01
[58] Field of Search..............................357/258, 260

[56] References Cited

UNITED STATES PATENTS

| | | | |
|---|---|---|---|
| 2,957,114 | 10/1960 | Lamphier | 317/258 X |
| 3,048,750 | 8/1962 | Netherwood | 317/260 X |
| 3,202,892 | 8/1965 | Netherwood | 317/260 X |
| 3,522,496 | 8/1970 | Grahame | 317/260 X |
| 3,447,048 | 5/1969 | Wurster | 317/258 |

Primary Examiner—E. A. Goldberg
Attorney—Arthur G. Connolly et al.

[57] ABSTRACT

An electrical capacitor has a pair of convolutely wound electrodes, each of which has a mat surface and a polished surface. The mat surfaces of the electrodes are in contact with and separated by a polyolefin spacer, and the polished surfaces of the electrodes have a polyolefin spacer and a porous dielectric spacer therebetween. The capacitor is impregnated with a dielectric impregnant which is fluid at least at the time of impregnation.

7 Claims, 3 Drawing Figures

PATENTED JAN 30 1973

3,714,528

3,714,528

ELECTRICAL CAPACITOR WITH FILM-PAPER DIELECTRIC

BACKGROUND OF THE INVENTION

This invention relates to electrical capacitors with film-paper dielectrics, and more particularly to electrical capacitors having a single sheet of paper and a plastic film together as a dielectric spacer between a pair of foil electrodes and having another plastic film disposed between the other surfaces of the convolutely wound foils.

Capacitor dielectric spacers having previously been made of various materials and, of late, resin films either as the sole dielectric or in combination with paper layers. Impregnating these units presents those skilled in the art with many menacing problems. Units produced with thin resin films as the sole dielectrics are subject to "blocking." This condition results from the tendency of thin resin films to stick together. This blocking condition and the rather non-porous nature of the resin film tend to severely inhibit the impregnation of the multilayer film capacitor with a fluid dielectric. Units produced with paper layers in combination with resin films have also been tried; however, these units, as well as those outlined above, are rather expensive to produce because very thin films must be used.

Accordingly, the art would be advanced if a capacitor design could be found that was capable of being rather easily impregnated and that was more economical to produce than prior art units.

It is an object of the present invention to provide an electrical capacitor that uses resin film and is rather easily impregnated.

It is another object of this invention to provide such capacitors at an economical cost.

It is a further object of the invention to provide a capacitor design that will permit the use of a thicker resin film in producing advantageous results therefor.

SUMMARY OF THE INVENTION

An electrical capacitor has a pair of convolutely wound electrodes, each of which has a mat surface and a polished surface. The mat surfaces of the electrodes are in contact with and separated by a resin film spacer. The polished surfaces of the electrodes have both a resin film spacer and a porous dielectric spacer therebetween. The resin film spacer between the mat surfaces of the electrodes is preferably thicker than the other resin film spacer. The capacitor is impregnated with a dielectric impregnant which is fluid at least at the time of impregnation.

DESCRIPTION OF THE PREFERRED EMBODIMENTS

Figure 1:
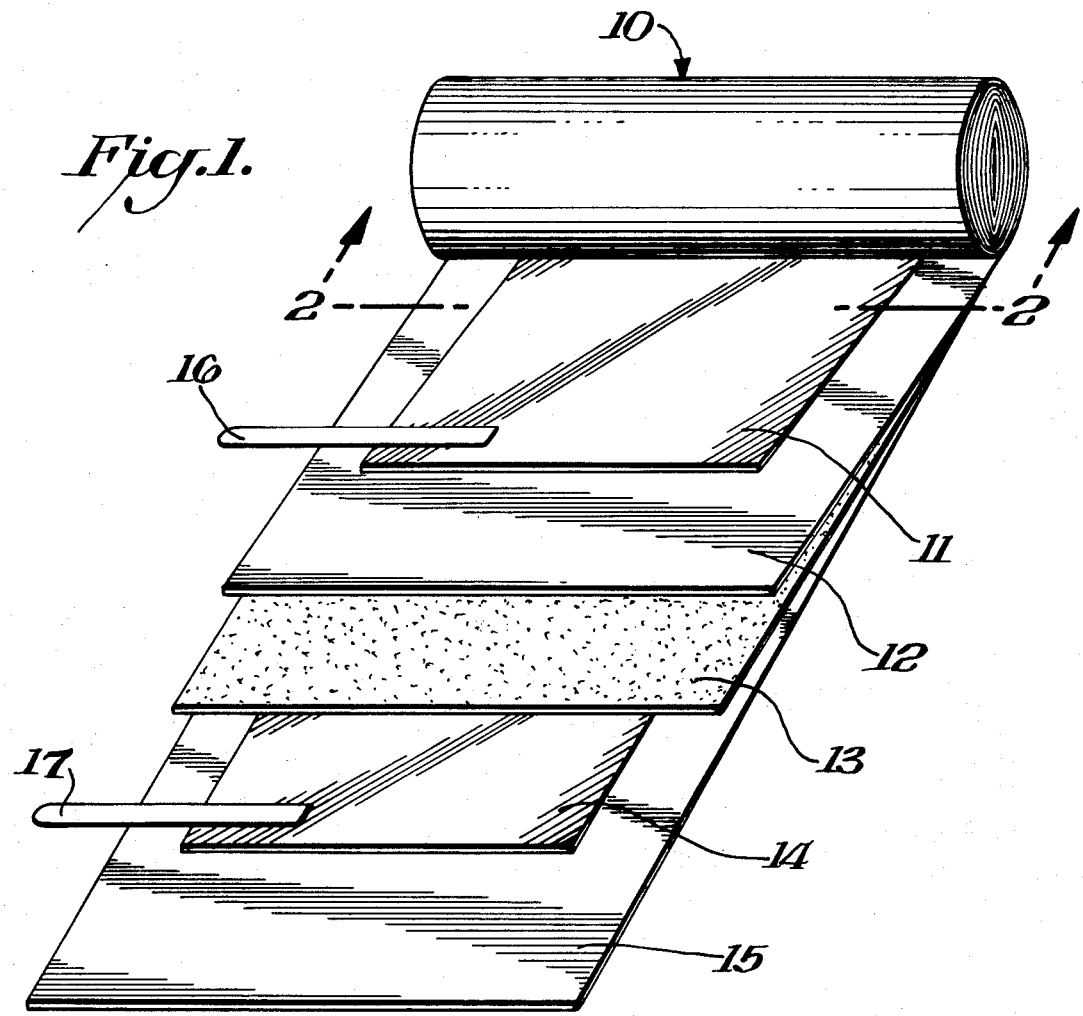
FIG. 1 shows a partially unwound capacitance section of one embodiment of the present invention.

The present invention involves a dielectric system that includes a single sheet of porous dielectric material and two resin films. This system can be described better by reference to FIG. 1. A capacitance section 10 has a convolutely wound dielectric system wherein 11 and 14 are first and second electrode foils respectively separated by a dielectric spacer composed of a sheet of a resin film 12 and a sheet of a porous dielectric material 13. Another sheet of a resin film 15 is positioned adjacent the second foil 14. Tabs 16 and 17 are connected to the first foil 11 and second foil 14, respectively, as terminals. The capacitance section 10 is then placed in a capacitor housing (not shown) and is impregnated.

The electrode foils are most advantageously of aluminum, although tin alloy foils could be used with similar, although less desirable, results. The aluminum foil used herein has a mat or dull surface and a polished or shiny surface that results from conventional rolling of a stacked pair of thin aluminum foils between a pair of pressure rolls. Polished surfaces are produced adjacent the rolls and a mat finish is produced on the surfaces in contact with each other. The capacitance section 10 described above is advantageously arranged so that the dielectric spacer 12, 13 separates the polished surfaces of the foils. This permits the second resin film 15 to separate and be in contact with the mat surfaces of both of the electrode foils when the capacitance section 10 is convolutely wound. This arrangement enhances the impregnation of this second resin film, since the rather rough mat surface of the foils, in conjunction with the minute holes found in thin aluminum foil, allows the impregnant to creep in between the foils and the film.

Figure 2:
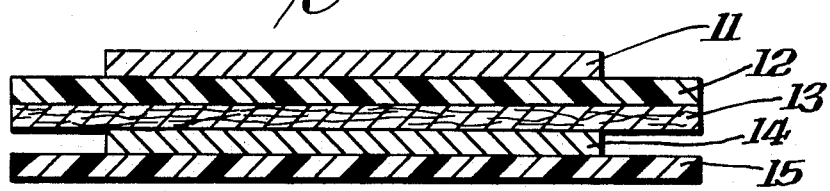
FIG. 2 is a cross section of FIG. 1 taken along line 2—2.

FIG. 2 is a cross sectional view of FIG. 1 along line 2—2, where the electrode foils are 11 and 14, the resin films being 12 and 15, and a porous dielectric spacer 13 separating the film 12 from the electrode foil 14.

The porous dielectric material 13 is a capacitor-grade absorbent paper, such as Kraft paper. Obviously the use of this paper herein permits a better and more complete impregnation than units made with resin films, but having no paper. It should be noted also, that by positioning the tab 17 on the polished surface of the foil 14 adjacent the paper, the paper acts as a shock absorber for the tab.

The resin films 12 and 15 can be nearly any plastic film, however, it is preferred to use the polyolefin film, polypropylene. Capacitors of this material, when impregnated with a liquid dielectric impregnant, have very desirable electrical characteristics. Prior art systems have used two or more thin films in the dielectric system, and this is very expensive since the thinner the film is, the more costly it is to produce and use. The present invention produces a system that permits the use of a single sheet of film for one-half of the dielectric system, thereby enabling one to use a thicker and less costly second film.

A typical system would have the following dimensions: the dielectric spacer has a sheet of polypropylene and a sheet of paper, both of which are 0.25 mil thick, the second film is thicker, measuring approximately 0.35 mil, and the foils are approximately 0.22 mil thick and are more narrow than the paper or films.

Figure 3:
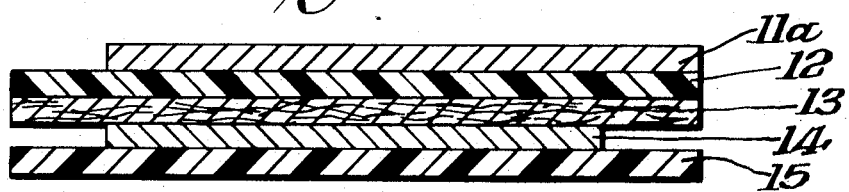
FIG. 3 is a similar cross section showing another embodiment of this invention.

In another embodiment, one of the foils 11a is extended to be flush with the films and the paper as shown in FIG. 3. This arrangement enhances the impregnation process; however, care must be taken to insulate the roll by any insulating means known to one skilled in the art, such as, for example, insulating the bottom of the capacitor housing by placing insulating material therein.

Any commercially available dielectric impregnant can be used in these units which is fluid at least at the time of impregnation, such as silicone oil or mixtures of chlorinated diphenyls.

Since it is obvious that many changes and modifications can be made in the above-described details without departing from the nature and spirit of the invention, it is to be understood that the invention is not limited to said details except as set forth in the appended claims.

What is claimed is:

1. An electrical capacitor comprising a capacitance section having a pair of convolutely wound foil electrodes, each of said electrodes having a mat surface and a polished surface, the mat surfaces of said electrodes being in contact with and separated by a first resin film spacer, and the polished surfaces of said electrodes having a second resin film spacer and a porous dielectric spacer therebetween, said section being impregnated with a dielectric impregnant.

2. The capacitor of claim 1 wherein said foil electrodes are selected from aluminum or thin alloy foils.

3. The capacitor of claim 1 wherein said first resin film spacer and second resin film spacer are polypropylene.

4. The capacitor of claim 1 wherein said porous dielectric material is paper.

5. The capacitor of claim 1 wherein said first resin film is thicker than said second resin film.

6. The capacitor of claim 2 wherein one of said foil electrodes is flush at one end with both said film spacers and said porous dielectric spacer.

7. An electrical capacitor comprising a pair of convolutely wound porous aluminum foil electrodes each of said electrodes having a mat surface and a polished surface, the mat surfaces of said electrodes being in contact with and separated by a first polypropylene film, the polished surfaces of said electrodes having a second polypropylene film and an absorbent paper spacer therebetween, said first polypropylene film being thicker than said second polypropylene film, and said capacitor being impregnated with a dielectric impregnant which is fluid at least at the time of impregnation.

* * * * *